(12) United States Patent
Makishima et al.

(10) Patent No.: US 6,690,913 B2
(45) Date of Patent: Feb. 10, 2004

(54) CORRECTION SUPPORT APPARATUS, CORRECTION SUPPORT METHOD, CORRECTION SUPPORT PROGRAM, AND CORRECTION SUPPORT SYSTEM

(75) Inventors: Shinji Makishima, Yokohama (JP); Tatsuya Haraguchi, Yokohama (JP); Kazuhiro Ogura, Yokohama (JP); Takeshi Ogaki, Tokyo (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 223 days.

(21) Appl. No.: 10/022,803

(22) Filed: Dec. 20, 2001

(65) Prior Publication Data

US 2003/0118976 A1 Jun. 26, 2003

(51) Int. Cl.[7] .................................................. G09B 3/00
(52) U.S. Cl. ........................ 434/350; 434/118; 434/322; 434/362
(58) Field of Search ................................ 434/118, 169, 434/307 R, 308, 322, 323, 324, 327, 335, 349, 350, 362, 427; 704/1, 251, 270; 345/780, 863; 707/1; 382/187

(56) References Cited

U.S. PATENT DOCUMENTS

| | | | | |
|---|---|---|---|---|
| 3,981,087 A | * | 9/1976 | Sachs | 434/308 |
| 4,728,294 A | * | 3/1988 | Bredehorn | 434/327 |
| 5,485,368 A | | 1/1996 | Ogaki et al. | |
| 5,596,698 A | * | 1/1997 | Morgan | 345/863 |
| 5,752,836 A | * | 5/1998 | Clark et al. | 434/322 |
| 5,819,040 A | | 10/1998 | Ogaki et al. | |
| 5,893,124 A | | 4/1999 | Ogaki et al. | |
| 5,918,222 A | * | 6/1999 | Fukui et al. | 707/1 |
| 6,112,051 A | * | 8/2000 | De Almeida | 434/362 |
| 6,618,504 B1 | * | 9/2003 | Yoshino | 382/187 |
| 2002/0110796 A1 | * | 8/2002 | Sugano et al. | 434/350 |
| 2002/0123028 A1 | * | 9/2002 | Knowles et al. | 434/324 |
| 2003/0046057 A1 | * | 3/2003 | Okunishi et al. | 704/1 |
| 2003/0049595 A1 | * | 3/2003 | Stuppy et al. | 434/350 |

FOREIGN PATENT DOCUMENTS

| | | |
|---|---|---|
| JP | 4-323860 | 11/1992 |
| JP | 5-67067 | 3/1993 |
| JP | 5-67099 | 3/1993 |
| JP | 5-191554 | 7/1993 |
| JP | 11-119636 | 4/1999 |

* cited by examiner

Primary Examiner—Joe H. Cheng
(74) Attorney, Agent, or Firm—Foley & Lardner (57) ABSTRACT

A correction support system enabling transmitting and receiving of a handwritten answer from a student, support for a corrector, and transmitting to and receiving by the student of a correction result is provided.

The correction support system 1 has a student apparatus 10, a server 20 connected to the student apparatus by communication lines 41 and 42, and a corrector apparatus 30 connected to the server by a communication line 43. In this case, the server separates the handwritten answers transmitted by the student question by question, gathers together the answers of a large number of students question by question, attaches information that is useful for correction such as the answer history for each of the students, and configures it into a format suitable for correction, and transmits it to the corrector apparatus. After correction is completed, the correction result form data are transmitted from the corrector apparatus to the server. The server reconfigures the corrected question answer sheet data in which the corrections have been added to the original question answer sheet data and transmits it to each of the respective student apparatuses, enabling the students to view it by means of the student apparatus.

21 Claims, 5 Drawing Sheets

CORRECTION SUPPORT APPARATUS, CORRECTION SUPPORT METHOD, CORRECTION SUPPORT PROGRAM, AND CORRECTION SUPPORT SYSTEM

BACKGROUND OF THE INVENTION

1. Field of the Invention

The present invention relates to a correction support apparatus, a correction support system, a correction support method, and a correction support program, and particularly relates to a correction support apparatus, a correction support system, a correction support method, and a correction support program for a correction support apparatus in which a student apparatus and a corrector apparatus are connected by a communication line enabling an answer obtained from the student apparatus to be edited and transmitted to the corrector apparatus, and a correction result obtained from the corrector apparatus to be re-edited and returned to the student apparatus.

2. Description of the Related Art

Conventionally, in the case of general correspondence courses, a student (a primary schoolchild or a junior high school student, for example) receives a question answer sheet by mail, writes answers thereon, and sends it back to the corrector by mail. In the cases of some recent correspondence courses, a facsimile apparatus or a computer (a personal computer) is used. For example, there is an automatic marking diagnostic device which is an invention disclosed in Japanese Patent Laid-Open No. HEI 5-191554. In that case, a mark entry field, a numerical entry field, and a free remark field are disposed on the question answer sheet, but the answers are principally constituted by marks and symbols.

The correction support system of the related art described above performs marking automatically by determining simple marks and symbols, and it is difficult for it to deal with cases in which handwritten answers (sentences or calculation processes, for example) are received and returned with corrections and general comments added thereto by hand. Furthermore, because answers from each student are gathered for each of the questions and support materials relating to each student for correcting the answers from each student are not provided automatically, correction efficiency cannot be improved.

SUMMARY OF THE INVENTION

The present invention aims to solve the above problems and an object of the present invention is to provide a correction support apparatus, a correction support system, a correction support method, and a correction support program enabling transmitting and receiving of a handwritten answer from a student, support for a correction process by a corrector, and transmitting to and receiving by the student of a correction result to be efficiently executed in a correspondence course performed by means of a communication line, for example.

In order to solve the problems described above, according to one aspect of the present invention, there is provided a correction support apparatus capable of being connected to a student apparatus and a corrector apparatus for returning a correction result obtained from the corrector apparatus in response to an answer obtained from the student apparatus, the correction support apparatus including:

a correction form data preparation means for sending out question answer sheet data obtained from the student apparatus in a student format to the corrector apparatus as correction form data configured into a correction format; and a question answer sheet data preparation means for reconfiguring and sending out to the student apparatus corrected question answer sheet data following the student format of the question answer sheet data based on correction result form data corrected by a corrector obtained from the corrector apparatus.

According to this kind of construction, students, for example, enter expressions showing calculation processes and sentences that are not simple marks, etc., by hand in response to questions on question answer sheets, and transmit them to the correction support apparatus by means of the student apparatus. The correction support apparatus according to the present invention configures the received question answer sheet data into a format suitable for correction and transmits it to the corrector apparatus as correction form data. Because the question answer sheet data is configured into a format which is suitable for correction, the corrector can perform correction efficiently. When correction by handwriting, etc., is completed, correction result form data is transmitted to the correction support apparatus from the corrector apparatus. The correction support apparatus reconfigures the corrected question answer sheet data in which the corrections have been added to the original question answer sheet data and transmits the corrected question answer sheet data to each of the applicable student apparatuses. The students can view the personalized corrected question answer sheet data as correction results on the question answer sheets which they themselves transmitted by printing them out, etc., using the student apparatus, for example.

The correction form data preparation means may prepare the correction form data by gathering an answer from each of a plurality of students matched to each student for each identical question from question answer sheet data received from a plurality of the student apparatuses. According to this construction, one corrector can perform correction of the same question for a plurality of students, making it efficient.

The correction form data preparation means may prepare as the correction form data:

an answer entry field containing an answer from each of the students; and a correction-related data field containing correction-related data being data relating to each of the students that is useful during correction. Using the correction-related data, the corrector has access to information such as strengths and weaknesses of each of the students, for example, enabling appropriate advice to be given.

The correction form data preparation means may prepare as the correction form data:

an answer entry field containing an answer from each of the students; and a model answer entry field containing model answer data. By referring to the model answer data, the corrector can give more appropriate advice.

The correction form data preparation means may prepare as the correction form data:

an answer entry field containing an answer from each of the students; and an answer history entry field containing an answer history relating to a past related question for each of the students. Using the answer history, the corrector has access to information such as strengths and weaknesses of each of the students, for example, enabling appropriate advice to be given.

A code may be disposed for each question answer sheet and for each question in the question answer sheet data for identifying:

the question answer sheet;

a student; and the question. By reading the code by means of a reader, processing and reconfiguration of each question for each of the students can be performed freely by a computer.

The correction support apparatus according to the present invention may further be provided with:

a transmission means for preparing the question answer sheet and transmitting the question answer sheet to the student apparatus.

The correction support apparatus may be constituted by a server connected to the student apparatus and the corrector apparatus by means of a network.

The student apparatus may be constituted by: a computer having at least one printer or scanner; or a facsimile.

The corrector apparatus may be constituted by: a computer having at least one printer or scanner; or a facsimile.

According to another aspect of the present invention, there is provided a correction support method including:

a step of receiving question answer sheet data transmitted from a student apparatus disposed near a student;

a step of preparing correction form data in which the question answer sheet data received from the student apparatus in a student format is configured into a correction format;

a step of transmitting the correction form data to a corrector apparatus disposed near a corrector;

a step of receiving corrected correction result form data transmitted from the corrector apparatus;

a step of reconfiguring corrected question answer sheet data following the student format of the question answer sheet data based on the correction result form data; and a step of transmitting the question answer sheet data to the student apparatus.

The step of preparing correction form data may include a step of preparing the correction form data by gathering an answer from each of a plurality of students matched to each student for each identical question from question answer sheet data received from the plurality of students.

The step of preparing correction form data may include a step of preparing:

an answer entry field containing an answer from each of a plurality of the students; and a correction-related data field for entering correction-related data being data useful during correction relating to each of the students.

The step of preparing correction form data may include a step of preparing:

an answer entry field containing an answer from each of a plurality of the students; and a model answer entry field for entering model answer data.

The step of preparing correction form data may include a step of preparing:

an answer entry field containing an answer from each of a plurality of the students; and an answer history entry field containing an answer history relating to a past related question for each of the students.

The correction support method according to the present invention may further be provided with:

a step of preparing the question answer sheet data and transmitting the question answer sheet data to the student apparatus.

According to yet another aspect of the present invention, there is provided a correction support program for executing a correction support method in a correction support apparatus connected by a communication line to a student apparatus and a corrector apparatus for returning a correction result performed by the corrector apparatus in response to an answer obtained from the student apparatus, the correction support program executing in the correction support apparatus:

a step of receiving question answer sheet data transmitted from the student apparatus;

a step of preparing correction form data in which the question answer sheet data received from the student apparatus in a student format is configured into a correction format;

a step of transmitting the correction form data to the corrector apparatus;

a step of receiving corrected correction result form data transmitted from the corrector apparatus;

a step of reconfiguring corrected question answer sheet data following the student format of the question answer sheet data based on the correction result form data; and a step of transmitting the question answer sheet data to the student apparatus.

According to yet another aspect of the present invention, there is provided a correction support system including:

a student apparatus;

a server connected to the student apparatus by means of a communication line; and a corrector apparatus connected to the server by means of a communication line, the student apparatus receiving a question answer sheet on which an answer is handwritten and transmitting the question answer sheet to the server as question answer sheet data being image data in a student format, the server transmitting the received question answer sheet data to the corrector apparatus as correction form data configured into a format suitable for correction, the corrector apparatus receiving correction result form data in which the received correction form data has been corrected by a corrector and transmitting the correction result form data to the server, the server reconfiguring a corrected question answer sheet data following the student format of the question answer sheet data based on the received correction result form data and transmitting the corrected question answer sheet data to the student apparatus, and the student apparatus being capable of printing out a corrected question answer sheet based on the corrected question answer sheet data personalized and transmitted thereto.

According to this kind of construction, students enter expressions showing calculation processes and sentences that are not simple marks, etc., by hand in response to questions on question answer sheets, and transmit them to the server by means of the student apparatus. The server configures the received question answer sheet data into a format suitable for correction and transmits it to the corrector apparatus as correction form data, the corrector can perform correction efficiently. Because the question answer sheet data is configured into a format which is suitable for correction, the corrector can perform correction efficiently. When correction by handwriting, etc., is completed, correction result form data is transmitted to the server from the corrector apparatus. The server reconfigures the corrected question answer sheet data in which the corrections have been added to the original question answer sheet data and transmits the corrected question answer sheet data to each of the applicable student apparatuses. The students can view the personalized corrected question answer sheet data as correction results on the question answer sheets which they themselves transmitted by printing them out, etc., using the student apparatus.

The server may prepare the correction form data by gathering an answer from each of a plurality of students matched to each student for each identical question from question answer sheet data received from the plurality of students when the question answer sheet data received by the server is configured into the format suitable for correction. Hence, one corrector can perform correction of the same question for a plurality of students, making it efficient.

The server may prepare the correction form data by attaching to each answer from each of a plurality of students:

a model answer corresponding to the answer from each of the students; and an answer history relating to a past related question for each of the students.

A code may be given for each question answer sheet and for each question in the question answer sheet data for identifying:

the question answer sheet;

a student; and the question.

DETAILED DESCRIPTION OF THE PREFERRED EMBODIMENT

The preferred embodiment of the present invention will be explained below based on the accompanying drawings.

Figure 1:
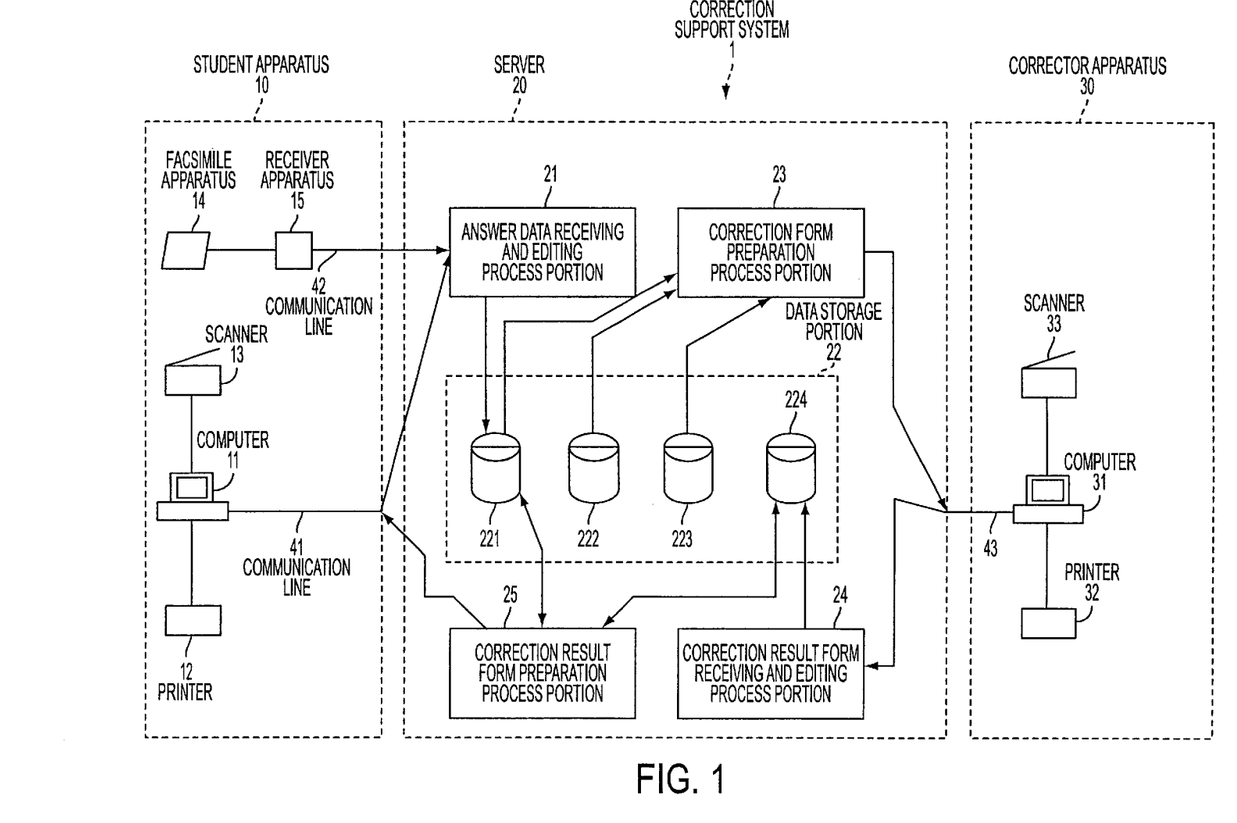
FIG. 1 is a block diagram showing a preferred embodiment of a correction support system according to the present invention.
Figure 2A:
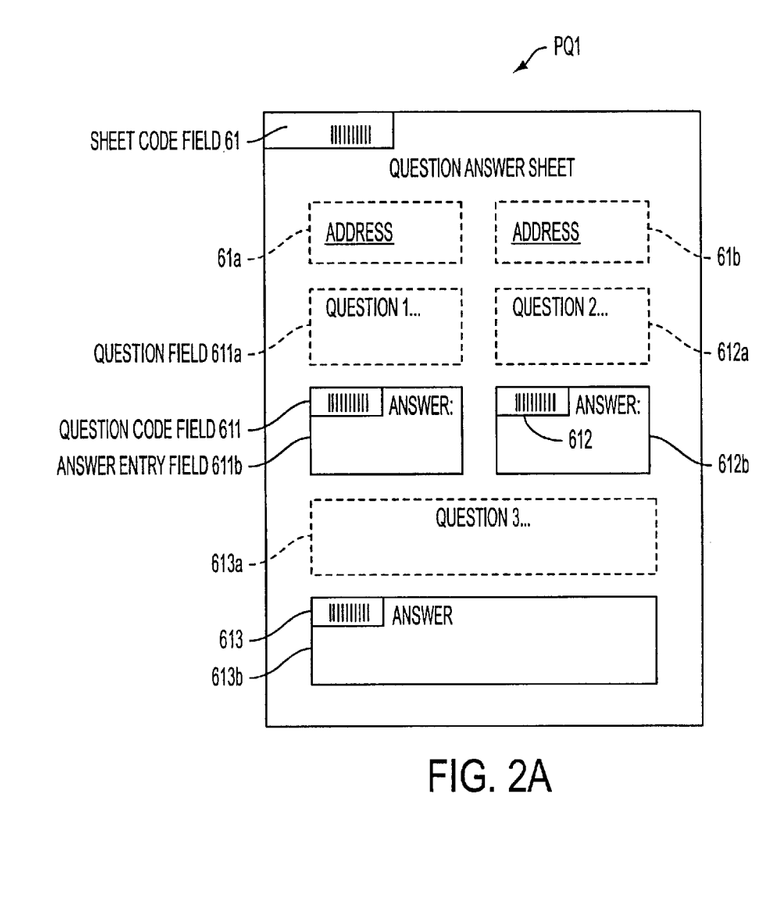
FIG. 2A is a diagram explaining a first page of a question answer sheet used in the correction support system in FIG. 1.
Figure 2B:
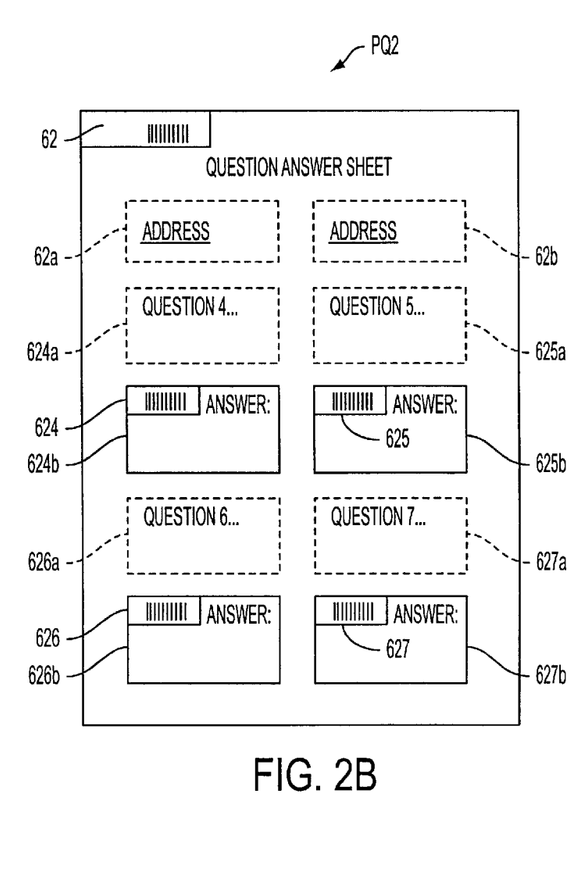
FIG. 2B is a diagram explaining a second page of the question answer sheet used in the correction support system in FIG. 1.
Figure 3:
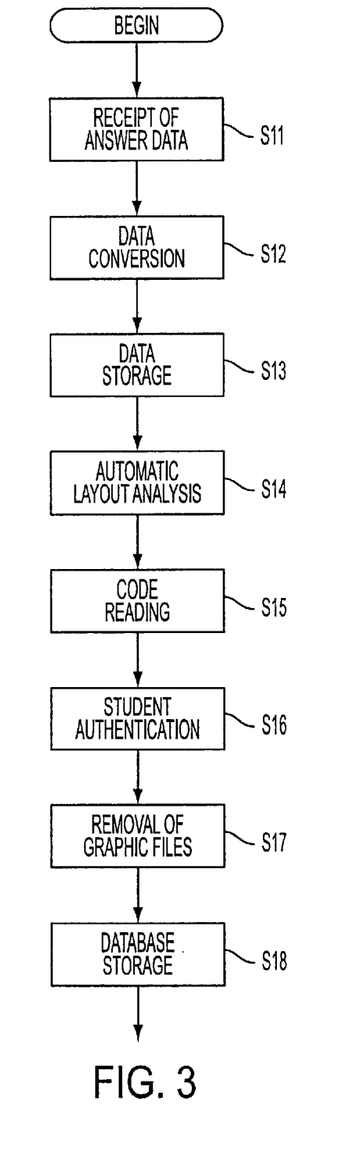
FIG. 3 is a flowchart explaining the operation of an answer data receiving and editing process portion in FIG. 1.
Figure 4:
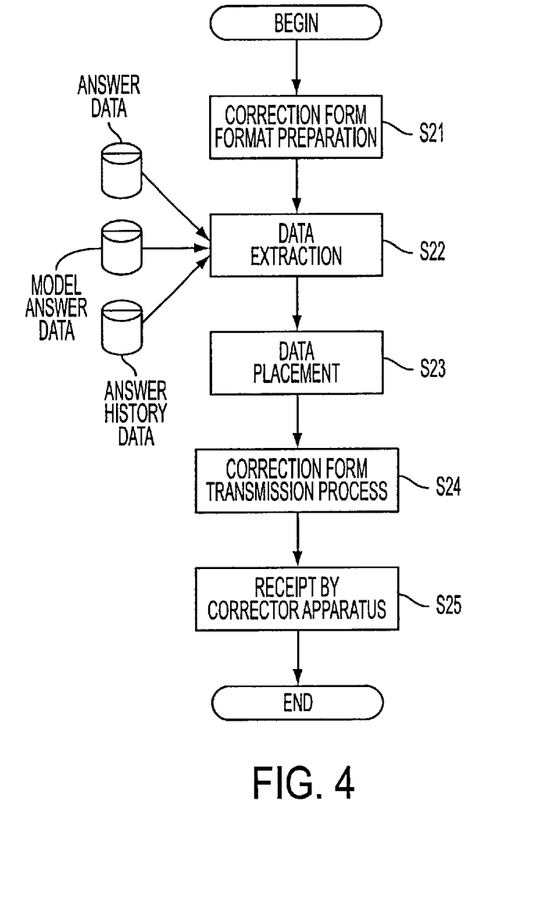
FIG. 4 is a flowchart explaining the operation of a correction form preparation process portion in FIG. 1.
Figure 5:
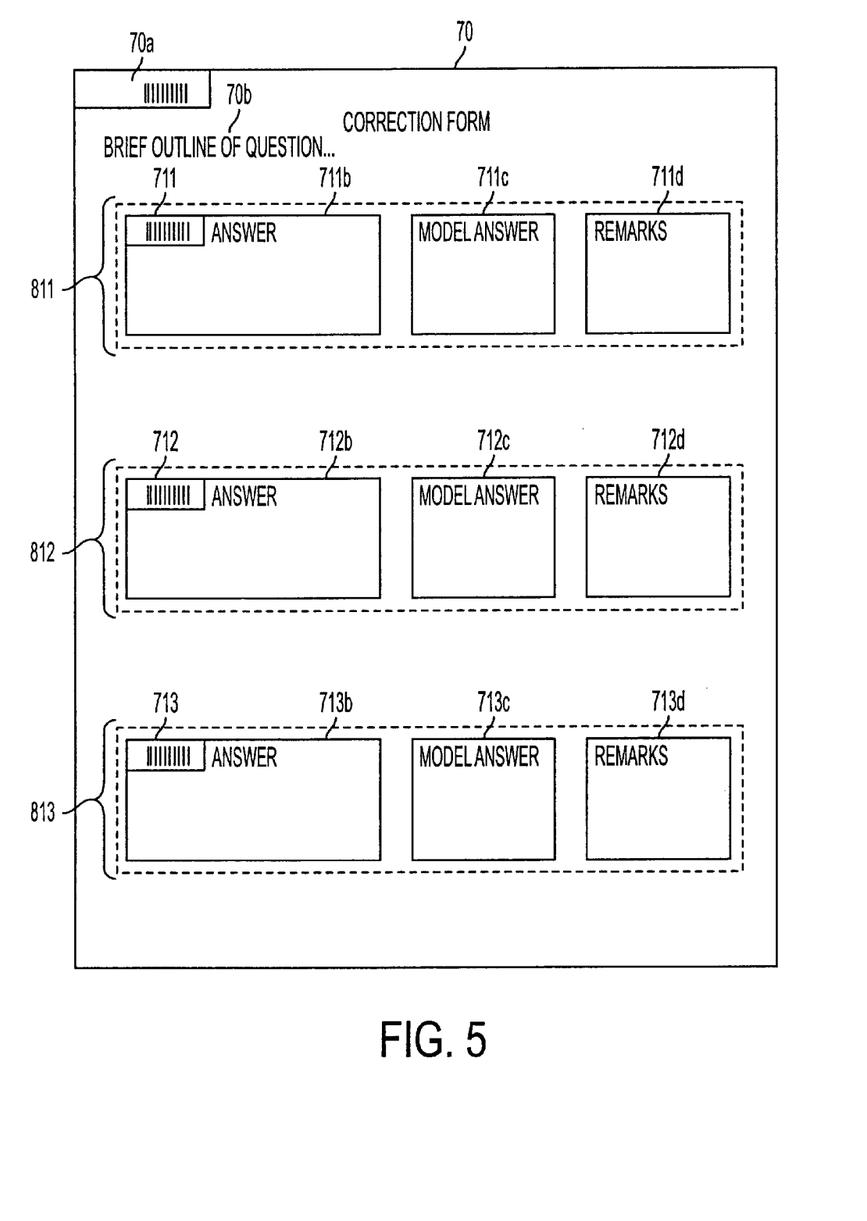
FIG. 5 is a diagram explaining a correction form format by which the correction form preparation process portion in FIG. 1 prepares a correction form.
Figure 6:
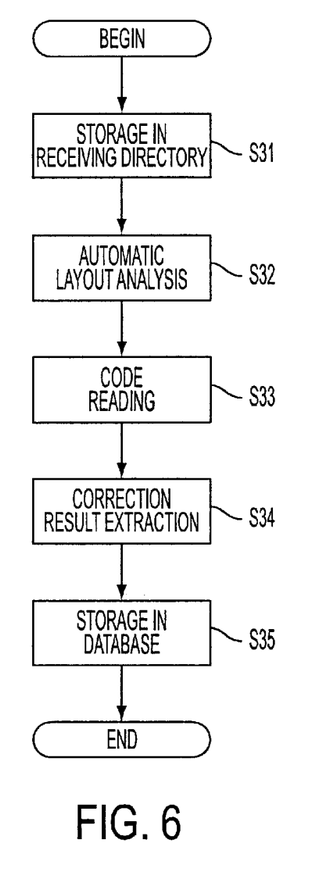
FIG. 6 is a flowchart explaining the operation of a correction result form receiving and editing process portion in FIG. 1.
Figure 7:
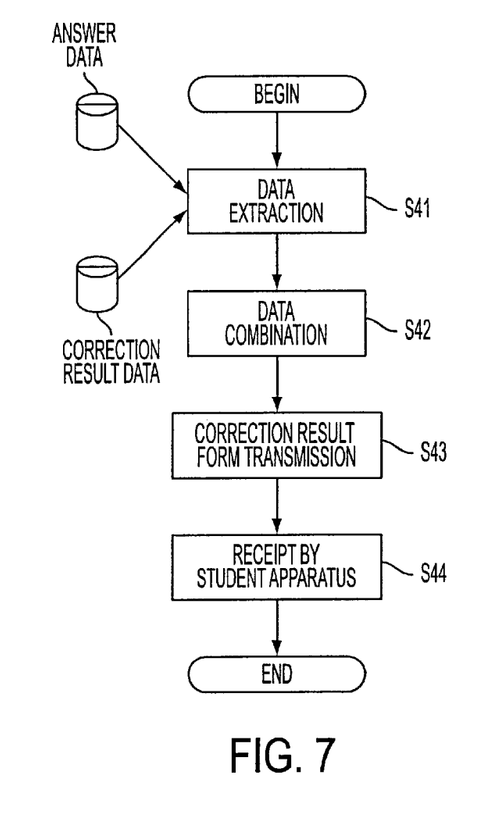
FIG. 7 is a flowchart explaining the operation of a correction result form preparation process portion in FIG. 1.

FIG. 1 is a block diagram showing a preferred embodiment of a correction support system according to the present invention, FIG. 2A is a diagram explaining a first page of a question answer sheet used in the correction support system in FIG. 1, FIG. 2B is a diagram explaining a second page of the question answer sheet used in the correction support system in FIG. 1, FIG. 3 is a flowchart explaining the operation of an answer data receiving and editing process portion in FIG. 1, FIG. 4 is a flowchart explaining the operation of a correction form preparation process portion in FIG. 1, FIG. 5 is a diagram explaining a correction form format by which the correction form preparation process portion in FIG. 1 prepares a correction form, FIG. 6 is a flowchart explaining the operation of a correction result form receiving and editing process portion in FIG. 1, and FIG. 7 is a flowchart explaining the operation of a correction result form preparation process portion in FIG. 1.

The correction support system 1 shown in FIG. 1 is constituted by: a student apparatus 10; a server 20; communication lines 41 and 42 for connecting the student apparatus 10 and the server 20; a corrector apparatus 30; and a communication line 43 for connecting the server 20 and the corrector apparatus 30. The student apparatus 10 includes: a computer 11 (a personal computer, for example) connected to the communication line 41; and a printer 12 and a scanner 13 connected to the computer 11, and in addition, when necessary (when a scanner 13 is not available, for example), includes a facsimile apparatus 14 connected to the server 20 by means of a receiver apparatus (a fax modem) 15 and the communication line 42. The server 20 includes: an answer data receiving and editing process portion 21; a data storage portion 22; a correction form preparation process portion 23; a correction result form receiving and editing process portion 24; and a correction result form preparation process portion 25. In this case, the data storage portion 22 includes: an answer data storage portion 221; a model answer data storage portion 222; an answer history data storage portion 223; and a correction result data storage portion 224.

In the server 20 described above, the answer data receiving and editing process portion 21 is connected to the computer 11 and the receiver apparatus 15 of the student apparatus 10 by means of the communication lines 41 and 42, respectively, and can also access the answer data storage portion 221. The correction form preparation process portion 23 is connected to the communication line 43 and can also access the answer data storage portion 221, the model answer data storage portion 222, and the answer history data storage portion 223. The correction result form receiving and editing process portion 24 is connected to the communication line 43 and can also access the correction result data storage portion 224. The correction result form preparation process portion 25 is connected to the computer 11 of the student apparatus 10 by means of the communication line 41, and can also access the answer data storage portion 221 and the correction result data storage portion 224. The corrector apparatus 30 includes: a computer 31 (a personal computer, for example) connected to the communication line 43; and a printer 32 and a scanner 33 connected to the computer 31.

Question answer sheet data is sent from the server 20 to the student by means of the communication lines 41 and 42, etc. In this embodiment, a first page and a second page of the question answer sheet sent to Student A, for example, among Students A, B, C, etc., are shown in FIGS. 2A and 2B. (Naturally, these are merely examples and the format of the question answer sheet is not limited thereto.) Sheet code fields 61 and 62 in which question answer sheet codes YC1 and YC2, respectively, are entered in page sequence are disposed on Question Answer Sheets (data) PQ1 and PQ2 (PQ3 and onward are not shown) in FIGS. 2A and 2B. Moreover, because explanation relating to the pages of Question Answer Sheet PQ3 (code YC3) and onward is substantially the same as that relating to Question Answer Sheet PQ2, explanation of Question Answer Sheets PQ1 and PQ2 only will be given hereafter unless otherwise necessary.

An address entry field 61a and a full name entry field 61b for Student A, being a respondent, are disposed on Question Answer Sheet PQ1, and an address entry field 62a and a full name entry field 62b for the respondent are each disposed on Question Answer Sheet PQ2. Moreover, in this example, the address entry field and the full name entry field are shown as being disposed in a similar manner on every page, but these are disposed in case only a specific page is submitted, and if a condition is set that "The first page must always be submitted, " or the like, the address entry field and the full name entry field may be disposed only on the first page.

Question fields 611a, 612a, and 613a in which Questions 1, 2, and 3 are entered sequentially, question code fields 611, 612, and 613 containing question codes AC1, AC2, and AC3 for each of the questions, and answer entry fields 611b, 612b, and 613b for entering an answer for each of the questions are disposed on the first page PQ1 (code YC1) of the question answer sheets described above. Question fields 624a, 625a, 626a, and 627a in which Questions 4, 5, 6, and 7 are entered sequentially, question code fields 624, 625, 626, and 627 containing question codes AC4, AC5, AC6, and AC7 for each of the questions, and answer entry fields 624b, 625b, 626b, and 627b for entering an answer for each of the questions are disposed on the next page PQ2 (code YC2).

The question answer sheet codes YC1 and YC2 on Question Answer Sheets PQ1 and PQ2 described above include: a student identification number for specifying the student this question answer sheet was sent to; a sheet identification number for specifying the question answer sheet in question; and page information indicating what number the page is among all pages of the question answer sheet in question. The question codes AC1, AC2, and AC3 on Question Answer Sheet PQ1 include the question answer sheet code YC1 and information indicating a question number. The question codes AC4, AC5, AC6, and AC7 on Question Answer Sheet PQ2 include the question answer sheet code YC2 and information indicating the question number. In this example, the question codes include a question answer sheet code and information indicating the question number, but the question answer sheet codes may also be combined when necessary, only information indicating the question number then being entered in the question codes.

Next, the operation of each portion of the correction support system 1 shown in FIG. 1 will be explained. The student receives format data for the question answer sheet of the kind shown in FIGS. 2A and 2B by means of the computer 11 via the communication line 41, and prints it out on the printer 12 by operating the computer 11. Necessary items are entered into the address entry field 61a and the full name entry field 61b by hand, and answers corresponding to each of Questions 1 through 7 are entered into each of the answer entry fields 611b, 612b, 613b, 624b, 625b, 626b, and 627b by hand. Here, the reason for having the student reply by hand is that a large proportion of the students are of a young age and writing characters (Chinese characters, etc.,) by hand is better for remembering the characters, enabling writing of the characters to be taught together with whatever kind of course is being studied.

First, the operation of the answer data receiving and editing process portion 21 will be explained with reference to the flowchart in FIG. 3. The student reads Question Answer Sheets PQ1 and PQ2 in FIGS. 2A and 2B on which the answers have been entered into the scanner 13 with the help of the computer 11 and transmits them to the answer data receiving and editing process portion 21 of the server 20 via the communication line 41. Or, the student transmits Question Answer Sheets PQ1 and PQ2 on which the answers have been entered to the answer data receiving and editing process portion 21 via the receiver apparatus 15 and the communication line 42 using the facsimile apparatus 14. Thus, the answer data receiving and editing process portion 21 receives image data of Question Answer Sheets PQ1 and PQ2 sent via the communication line 41 or the communication line 42 and stores them in a receiving directory in the answer data storage portion 221 (S11), converts the stored image data into standard raster data (TIFF format or GIF format) (S12), and stores them in an answer data save directory in the answer data storage portion 221 (S13).

The answer data receiving and editing process portion 21 performs an automatic layout analysis process on the raster data stored in the answer data storage portion 221. In other words, the sheet code fields 61 and 62, the question code fields 611, 612, 613, 624, 625, 626, and 627, and the answer entry fields 611b, 612b, 613b, 624b, 625b, 626b, and 627b are framed (S14). The question answer sheet code YC1 in the framed sheet code field 61 is read (S15), and authentication that the student is legitimate is made by confirming that the student identification number contained in the question answer sheet code YC1 agrees with a student identification number pre-registered with the server 20 (S16). With the answers from a legitimate student, the answer data receiving and editing process portion 21 separates the question codes AC1 through AC7 and the entry contents of the answer entry fields 611b through 627b in the framed question code fields 611 through 627 from the rest of the image data (S17), and stores the two separated portions in an answer database in the answer data storage portion 221 (S18). Thereafter, processing is performed by the correction form preparation process portion 23.

The operation of the correction form preparation process portion 23 will be explained with reference to FIG. 4. The correction form preparation process portion 23 prepares a correction form format (See FIG. 5) (S21). In other words, the correction form preparation process portion 23 refers to the contents of the answer database that the answer data receiving and editing process portion 21 has stored in the answer data storage portion 221 and prepares a correction form of the kind shown in FIG. 5 for each of the questions. Only one sheet from the correction form is shown in FIG. 5, but it goes without saying that if there is a large number of students for a single problem, for example, there may be a plurality of sheets, and if there are other questions, those questions will be prepared separately.

Disposed on the correction form 70 shown in FIG. 5 are: a correction form code field 70a containing a correction form code; a question outline field 70b containing a brief outline of the applicable question; and correction-related data fields 811, 812, and 813 containing, for example, data suitable for corrections relating to Students A, B, and C, respectively, for the same question. Among the correction-related data fields 811, 812, and 813 described above, disposed in the correction-related data field 811 relating to Student A, for example, are: a question code field 711 containing the question code; an answer entry field 711b corresponding to the question code; a model answer entry field 711c for recording model answer data from the model answer data storage portion 222; and a remarks column 711d for recording related past answer history data, etc., for the student from the answer history data storage portion 223. The correction-related data fields 812 and 813 relating to Students B and C are also similar.

The correction form preparation process portion 23 accesses the answer data storage portion 221, the model answer data storage portion 222, and the answer history data storage portion 223 and extracts data required for each of the fields of the prepared correction form format (S22), and places the data in each of the corresponding fields (S23). In this case, for example, data corresponding to the form identification number of the question answer sheet code of Question Answer Sheets PQ1 and PQ2 is included in the correction form code field 70a, and a question code corresponding to the question code AC1 in the question code field 611 of Question Answer Sheet PQ1, for example, is recorded in the question code field 711. The correction form prepared in this manner is transmitted to the corrector in charge of this question (a lecturer or a teacher, for example) via the communication line 43 (S24). The transmitted correction form is received by the computer 31 of the corrector apparatus 30 (S25). Consequently, if responsibility is divided among the correctors question by question, the number of questions each corrector handles is reduced, enabling correction to be performed efficiently, and also making assessment and advice for each of the students fair and standardized.

When corrections are going to be made by hand, the corrector prints out the correction form received by the computer 31 using the printer 32, adds comments, etc., by hand, reads the completely corrected correction result form into the scanner 33, and transmits it from the computer 31 via the communication line 43 to the server 20. The transmitted correction result form is received by the correction result form receiving and editing process portion 24 of the server 20. It is often more convenient to do this by hand, but when it is desirable that corrections be made using a keyboard, the correction form received by the computer 31 is displayed on a monitor screen, comments, etc., about the answers entered by the respondent are added using the keyboard while referring to the model answer and the answer history, and the corrected correction result form is transmitted from the computer 31 via the communication line 43 to the server 20.

The corrected result form receiving and editing process portion 24, as shown in the flowchart in FIG. 6, temporarily stores the received correction result form in a receiving directory in the correction result data storage portion 224 (S31). The corrected result form receiving and editing process portion 24 recognizes the correction form code field 70a on the correction result form, question code fields 711, 712, and 713 containing the question codes, and answer entry fields 711b, 712b, and 713b corresponding to those question codes by performing an automatic layout analysis process on the stored correction result form (S32), recognizes the students by reading the codes in the recognized correction form code field 70a and question code fields 711, 712, and 713 (S33), extracts image data being the contents of the answer entry fields 711b, 712b, and 713b for each of the students (S34), and stores the extracted image data for each of the students in a correction result database in the correction result data storage portion 224 (S35).

The correction result form preparation process portion 25, as shown in the flowchart in FIG. 7, extracts the image data of the separated question answer sheet (See Step S17 in FIG. 3) from the answer data storage portion 221, and also extracts the image data of the correction result from the correction result data storage portion 224 (S41), and combines both to reconfigure them into a layout the same as the layout of the question answer sheet in FIG. 2 for each of the students (S42). Hence, a correction result form for each of the students reconfigured by further adding the corrections to the question answer sheet in FIG. 2 into which the student has entered the answers is stored in the answer data storage portion 221, and the same thing is also transmitted to the computer 11 of each of the student apparatuses 10 in question via the communication line 41 (S43). The student can display the correction result form complete with personalized corrections on a receiving display by means of the computer 11 of the student apparatus 10, or the correction result can be confirmed by printing it out using the printer 12 (S44).

Hence, in the correction support system 1, the server 20 separates the handwritten answers transmitted by the student question by question, gathers together the answers of a large number of students question by question, attaches information that is useful for correction such as the answer history for each of the students, and configures it into a format suitable for correction, and transmits it to the corrector apparatus of the corrector in charge of correction of that question. After correction is completed, the correction result form data are transmitted from the corrector apparatus to the server. The server reconfigures the corrected question answer sheet data in which the corrections have been added to the original question answer sheet data and transmits it to each of the respective student apparatuses, enabling the students to view it by means of the student apparatus. Consequently, for complex answers such as handwritten answers, because the server 20 separates the answers question by question, gathers together the separated answers of a large number of students question by question, attaches information that is useful for correction such as the answer history for each of the students, and supplies it to the corrector, corrections can be processed efficiently. Furthermore, because it is reconfigured into the format of the original question answer sheet and transmitted to each of the students after correction, the students can receive an extremely natural-looking correction result irrespective of intermediate processing by the server.

Because the preferred embodiment of the present invention is constructed as explained above, students enter expressions showing calculation processes and sentences that are not simple marks, etc., by hand in response to the questions on the question answer sheets, and transmit them to the server by means of the student apparatus. Because the server configures the received question answer sheet data into a format suitable for correction and transmits it to the corrector apparatus as correction form data, the corrector can perform correction efficiently. When correction by handwriting, etc., is completed, correction result form data is transmitted to the server from the corrector apparatus. The server reconfigures the corrected question answer sheet data in which the corrections have been added to the original question answer sheet data and transmits the corrected question answer sheet data to each of the applicable student apparatuses. The students can view the personalized corrected question answer sheet data as correction results on the question answer sheets which they themselves transmitted by printing them out, etc, using the student apparatus. In other words, answers such as handwritten sentences or expressions can be processed efficiently instead of answers constituted by simple marks and symbols.

What is claimed is:

1. A correction support apparatus capable of being connected to a student apparatus and a corrector apparatus for returning a correction result obtained from said corrector apparatus in response to an answer obtained from said student apparatus, said correction support apparatus comprising:
a correction form data preparation means for sending out question answer sheet data on which an answer is handwritten obtained from said student apparatus in a student format to said corrector apparatus as correction form data configured into a correction format; and
a question answer sheet data preparation means for reconfiguring and sending out to said student apparatus corrected question answer sheet data following said student format of said question answer sheet data based on correction result form data corrected by a corrector obtained from said corrector apparatus.

2. The correction support apparatus according to claim 1 wherein:
said correction form data preparation means prepares said correction form data by gathering an answer from each of a plurality of students matched to each student for each identical question from question answer sheet data received from a plurality of said student apparatuses.

3. The correction support apparatus according to claim 2 wherein:
said correction form data preparation means prepares as said correction form data comprising:
an answer entry field containing an answer from each of said students; and
a correction-related data field containing correction-related data being data relating to each of said students that is useful during correction.

4. The correction support apparatus according to claim 2 wherein:
said correction form data preparation means prepares as said correction form data comprising:
an answer entry field containing an answer from each of said students; and
a model answer entry field containing model answer data.

5. The correction support apparatus according to claim 2 wherein:
said correction form data preparation means prepares as said correction form data comprising:
an answer entry field containing an answer from each of said students; and
an answer history entry field containing an answer history relating to a past related question for each of said students.

6. The correction support apparatus according to claim 1 wherein:
a code is disposed for each question answer sheet and for each question in said question answer sheet data for identifying:
said question answer sheet;
a student; and
said question.

7. The correction support apparatus according to claim 6 further provided with:
a transmission means for preparing said question answer sheet and transmitting said question answer sheet to said student apparatus.

8. The correction support apparatus according to claim 1 wherein:
said correction support apparatus is constituted by a server connected to said student apparatus and said corrector apparatus by means of a network.

9. The correction support apparatus according to claim 8 wherein:
said student apparatus is constituted by:
a computer having at least one printer or scanner; or
a facsimile.

10. The correction support apparatus according to claim 8 wherein:
said corrector apparatus is constituted by:
a computer having at least one printer or scanner; or
a facsimile.

11. A correction support method comprising:
a step of receiving question answer sheet data on which an answer is handwritten transmitted from a student apparatus disposed near a student;
a step of preparing correction form data in which said question answer sheet data received from said student apparatus in a student format is configured into a correction format;
a step of transmitting said correction form data to a corrector apparatus disposed near a corrector;
a step of receiving corrected correction result form data transmitted from said corrector apparatus;
a step of reconfiguring corrected question answer sheet data following said student format of said question answer sheet data based on said correction result form data; and
a step of transmitting said question answer sheet data to said student apparatus.

12. The correction support method according to claim 11 wherein:
said step of preparing correction form data includes a step of preparing said correction form data by gathering an answer from each of a plurality of students matched to each student for each identical question from question answer sheet data received from said plurality of students.

13. The correction support method according to claim 11 wherein:
said step of preparing correction form data includes a step of preparing:
an answer entry field containing an answer from each of a plurality of said students; and
a correction-related data field for entering correction-related data being data useful during correction relating to each of said students.

14. The correction support method according to claim 11 wherein:
said step of preparing correction form data includes a step of preparing:
an answer entry field containing an answer from each of a plurality of said students; and
a model answer entry field for entering model answer data.

15. The correction support method according to claim 11 wherein:
said step of preparing correction form data includes a step of preparing:
an answer entry field containing an answer from each of a plurality of said students; and
an answer history entry field containing an answer history relating to a past related question for each of said students.

16. The correction support method according to claim 11 further comprising:
   a step of preparing said question answer sheet data and transmitting said question answer sheet data to said student apparatus.

17. A correction support program for executing a correction support method in a correction support apparatus connected by a communication line to a student apparatus and a corrector apparatus for returning a correction result performed by said corrector apparatus in response to an answer obtained from said student apparatus,
   said correction support program executing in said correction support apparatus comprising:
      a step of receiving question answer sheet data on which an answer is handwritten transmitted from said student apparatus;
      a step of preparing correction form data in which said question answer sheet data received from said student apparatus in a student format is configured into a correction format;
      a step of transmitting said correction form data to said corrector apparatus;
      a step of receiving corrected correction result form data transmitted from said corrector apparatus;
      a step of reconfiguring corrected question answer sheet data following said student format of said question answer sheet data based on said correction result form data; and
      a step of transmitting said question answer sheet data to said student apparatus.

18. A correction support system comprising:
   a student apparatus;
   a server connected to said student apparatus by means of a communication line; and
   a corrector apparatus connected to said server by means of a communication line,
      said student apparatus receiving a question answer sheet on which an answer is handwritten and transmitting said question answer sheet to said server as question answer sheet data being image data in a student format,
      said server transmitting said received question answer sheet data to said corrector apparatus as correction form data configured into a format suitable for correction,
      said corrector apparatus receiving correction result form data in which said received correction form data has been corrected by a corrector and transmitting said correction result form data to said server,
      said server reconfiguring a corrected question answer sheet data following said student format of said question answer sheet data based on said received correction result form data and transmitting said corrected question answer sheet data to said student apparatus, and
      said student apparatus being capable of printing out a corrected question answer sheet based on said corrected question answer sheet data personalized and transmitted thereto.

19. The correction support system according to claim 18 wherein:
   said server prepares said correction form data by gathering an answer from each of a plurality of students matched to each student for each identical question from question answer sheet data received from said plurality of students when said question answer sheet data received by said server is configured into said format suitable for correction.

20. The correction support system according to claim 18 wherein:
   said server prepares said correction form data by attaching to each answer from each of a plurality of students comprising:
      a model answer corresponding to said answer from each of said students; and
      an answer history relating to a past related question for each of said students.

21. The correction support system according to claim 18 wherein:
   a code is given for each question answer sheet and for each question in
   said question answer sheet data for identifying:
      said question answer sheet;
      a student; and
      said question.

* * * * *